United States Patent [19]

Chabrolle et al.

[11] Patent Number: 4,938,716
[45] Date of Patent: Jul. 3, 1990

[54] DEVICE FOR SETTING UP ELECTRICAL CONTACT AMONG CONDUCTORS DISTRIBUTED BETWEEN TWO ELEMENTS, NOTABLY CONTACTS BETWEEN THE ELEMENTS OF A MEMORY CARD AND THOSE OF ITS READER

[75] Inventors: Jacques Chabrolle; Jean-Claude Guyon, both of Beaune, France

[73] Assignee: Electroniques LCC-CICE, Courbevoie, France

[21] Appl. No.: 339,304

[22] Filed: Apr. 17, 1989

[30] Foreign Application Priority Data

Apr. 19, 1988 [FR] France .................... 88 05140

[51] Int. Cl.⁵ .............................. H01R 13/00
[52] U.S. Cl. ............................ 439/635; 439/376
[58] Field of Search ............ 439/326, 374, 376, 377, 439/635

[56] References Cited

U.S. PATENT DOCUMENTS 4,185,882 1/1980 Johnson .................... 439/326
4,747,790 5/1988 Masuda et al. .................... 439/326

Primary Examiner—Joseph H. McGlynn
Attorney, Agent, or Firm—Roland Plottel

[57] ABSTRACT

Disclosed is a device for setting up electrical contact among conductors distributed between a first element and a second element, the setting up of the contact between the conductors having to be made when the first element is in a determined position with respect to the second element. The devices has, inter alia a means to guide the first element towards the determined position and a stop designed to stop the first element when it has reached this determined position, this stop comprising means enabling the conductors to be gradually put into contact.

7 Claims, 2 Drawing Sheets

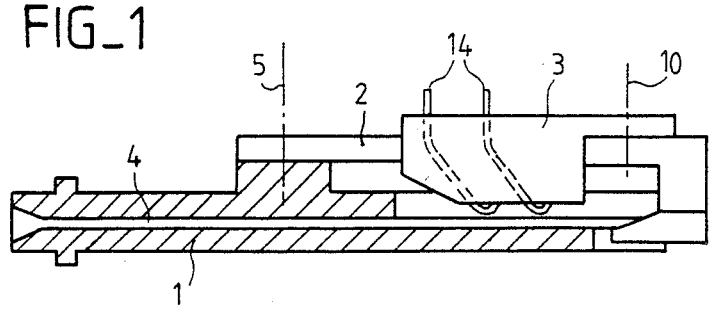
FIG_1
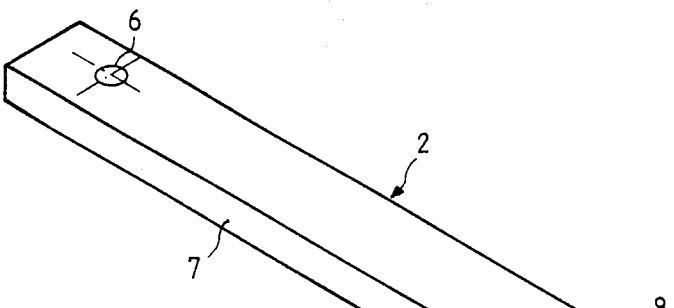
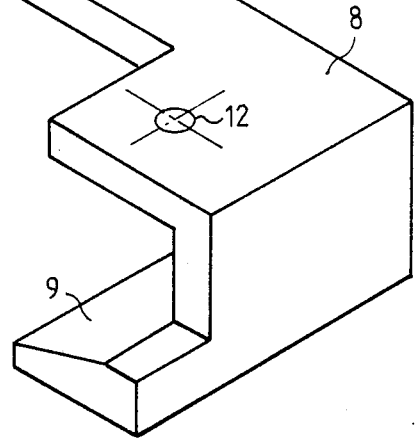
FIG_2
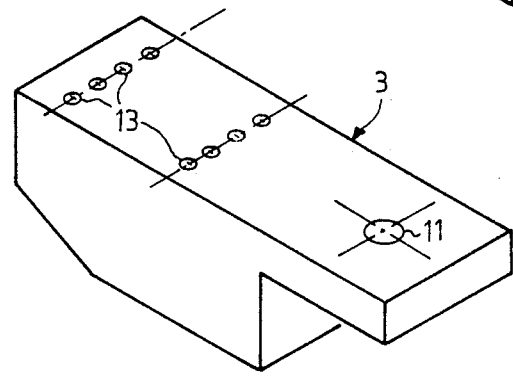
FIG_3

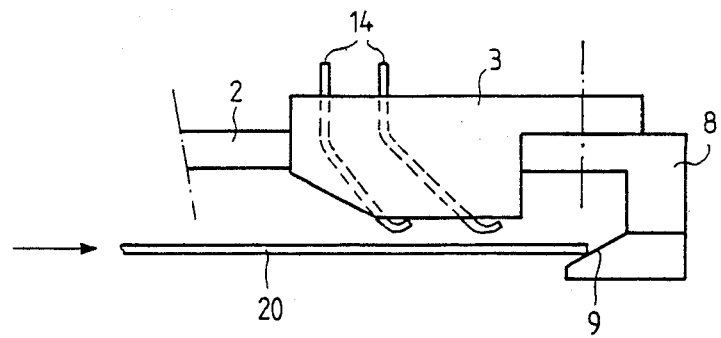
FIG_4
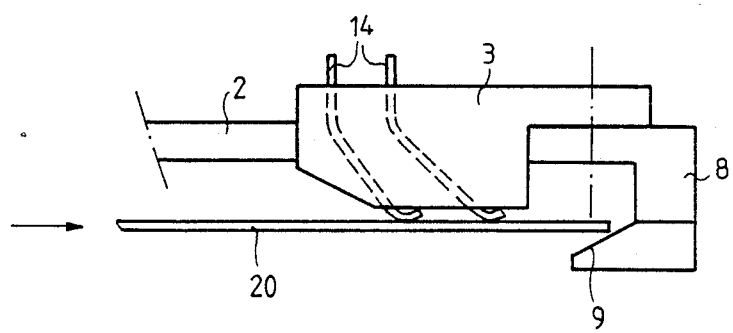
FIG_5
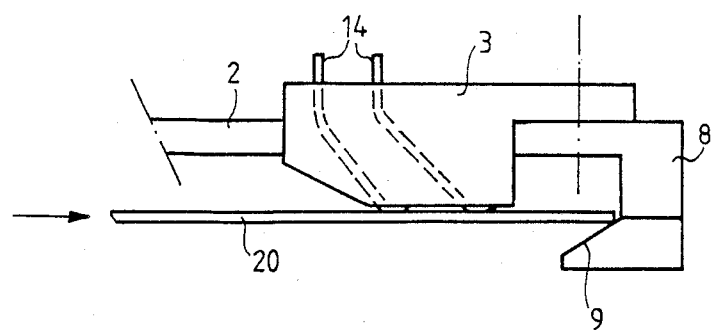
FIG_6

DEVICE FOR SETTING UP ELECTRICAL CONTACT AMONG CONDUCTORS DISTRIBUTED BETWEEN TWO ELEMENTS, NOTABLY CONTACTS BETWEEN THE ELEMENTS OF A MEMORY CARD AND THOSE OF ITS READER

BACKGROUND OF THE INVENTION

1. Field of the Invention

The present invention concerns a device for setting up electrical contact among conductors distributed between two elements, which can be used, notably, to make the electrical connection between the outputs of the integrated circuit of a memory card and the electronic part of the card reader.

2. Description of the Prior Art

The use of magnetic cards is now highly developed. The magnetic card (credit or payment card) plays a role similar to that of the check-book or cash. It is a new system of payment which has been baptised "computerized money". It takes the form of a plastic rectangle, and contains a certain number of items of information. These items of information are either etched in relief on the plastic, so that they can be reproduced by pressure when a transaction is done through the drawing up of an invoice on paper, or recorded electronically on a magnetic track so as to be read (and sometimes modified) by card readers and card encoders which are fitted into cash dispensing machines or transaction terminals.

The great increase in the number of automatic cash-dispensing machines and sales point terminals has promoted the use of cards with magnetic tracks. An international system of ISO standards (ISO 1, ISO 2, ISO 3 tracks) has come into use. Each track may contain a maximum of 100 characters: this represents a low capacity of storage. One of the tracks may be used in writing mode, with a limited capacity, but this necessitates driving at constant speed, thus excluding hand-held readers, called scan readers. With these readers, the magnetic card is slipped by hand into the slot of the machine. As it is being transferred from one end of the slot to the other, a magnetic track associated with the card goes past a reading head which uses the magnetic bits that constitute the encoding of the track.

The magnetic tracks have another drawback, namely imperfect security: this raises the problem of checking access and of the invoicing of telematic services.

For use with checks on access, it is more common to use a reader with frontal insertion. The card is inserted by one of its small sides, and engaged until it comes to a stop along three quarters of its length. The reader is provided with a reading head to process the track and the reading is done, as the case may be, when the card is inserted or removed. The integrated circuit card, more commonly called a memory card, can be used to resolve the problems of standard cards with magnetic tracks: namely, low capacity storage, insecurity of access and of invoicing. In the so-called memory card, there is inserted an integrated circuit, consisting of at least one memory and one logic circuit. The memory card also supports a magnetic track, containing pieces of information which do not require particular protection.

The gradual coming into use of combined cards, namely cards that are provided simultaneously with a magnetic track and a "electronic chip" (type CP8) has necessitated the installation of equipment adapted to these cards.

Thus, the use of a scanning reader leads the outfitter to install a specific reader as an extension the scanning reader. Other types of equipment take the form of a package, incorporating both types of readers and enabling the use of either as the case may be.

The problem that arises with the appearance of memory cards is that of the establishment of electrical contact between the electronic part of the reader and the outputs (8 in number) of the integrated circuit inserted in the card. This contact is particularly difficult and should meet the following imperatives:

there should be excellent technical connection between the electronic processing part and the external contacts of the card, owing to the very low currents used for the processing;

the contacts of the card should not be damaged, in order to ensure that it has long lifetime (several thousands of transactions), contact with the plastic part of the card should be prevented: this could generate poor electrical contacts through the deterioration of the external contacts, at the same time, a simple mechanical device should be used in order to ensure low cost price, compatible with widespread use of this equipment.

To meet these imperatives, the invention proposes an original contact-making device which can be applied particularly, but not exclusively, in a frontal reader. A frontal reader, thus formed, can be used, in the field of access checking, for the use of combined cards.

SUMMARY OF THE INVENTION

An object of the invention, therefore, is a device for setting up of electrical contact among conductors distributed between a first element and a second element, the setting up of the contact between the conductors having to be made when the first element is in a determined position with respect to the second element, the device being solidly joined to the second element. The device includes:

means to guide the first element towards said determined position;

a stop designed to stop the first element when it has reached said determined position, said stop comprising means enabling said conductors to be gradually put into contact.

BRIEF DESCRIPTION OF THE DRAWINGS

The invention will be better understood and other advantages will appear from the following description, given as a non-exhaustive example, and through the appended figures, of which:

FIG. 1 shows a device, according to the invention, for setting up of electrical contact among conductors distributed between two elements;

FIGS. 2 and 3 are detailed views of certain parts of the device shown in FIG. 1;

FIGS. 4 to 6 are explanatory drawings of the working of the device of FIG. 1.

DESCRIPTION OF PREFERRED EMBODIMENT

The device, according to the invention, for setting up electrical contact among conductors distributed between two elements, by the meeting or mutual approaching of these two elements, can be applied in a considerable number of technical fields. As an example, we shall deal herein with the particular application of the setting up of electrical contacts between the conductors of a memory card and those of its reader.

FIG. 1 shows a device of this type, formed by the assembly of different parts, some of which are show, in greater detail in FIGS. 2 and 3.

The device, shown in FIG. 1, for setting up electrical contact, has three essential parts: a card guide 1, a flexible strip 2 and a contact-holder 3.

The card guide 1 plays the role of guiding means for the memory card. It is shaped like a flat parallelepiped corresponding to the card which it has to receive. It is provided with a slot 4, enabling the insertion of the memory card. In FIG. 1, the card guide alone has been shown in a sectional view to enable a better understanding of the device. The card guide may be made of molded plastic material or of metal in which case, it will be shaped by drawing or stamping.

On the guide, and according to this particular application, the flexible strip 2 is fixed. The fixing can be done simply, by means of a screw along the axis 5, corresponding to the hole 6 in FIG. 2. The strip 2 may be made of plastic, thus enabling its rather complicated shape to be obtained with ease. The strip 2 has an arm 7, one end of which is pierced with the hole 6 while the other end is extended by a C-shaped part 8 with a width greater than the width of the arm 7. The part 8 will act as a stop to the memory card. It has a sloping portion 9 on its lower part.

The contact-holder 3 is fixed along the axis 10 on the flexible strip 2. The fixing can be done by screws, by means of the hole 11 pierced in the contact-holder and the tapped hole 12, pierced in the strip 2. These holes correspond to the axis 10 shown in FIG. 1. The contact-holder is very easily placed on the strip since these parts fit into one another. The contact-holder is pierced with holes 13 (eight in number for a CP8 type card) enabling the passage of electrical conductors or contacts 14 from its upper face to its lower face. Since the contact-holder 3 can be made of plastic, it is easily possible, when the part is being molded, to obtain the desired contour for the holes 13 and, for example, the contour shown in FIG. 1. Those parts of the contacts 14 that come out on to the lower face of the contact-holder are folded back towards the same face, in an elastically deformable, cross shape.

The device of FIG. 1 is fixed to the card reader, and the contacts 14 are then connected to the electronic processing circuits.

FIGS. 4 to 6 provide for an explanation of the working of the device during the insertion of a memory card. Only the parts 2 and 3 of the device have been shown, and this is enough to understand its working. This figure also shows the memory card 20 which, in fact, is guided by the card guide (not shown). The arrow indicates the direction of the motion given to the card 20.

FIG. 4 shows the instant where the card 20 comes into contact with the sloping part 9 of the stop 8. This position is not the final position of the card in the card reader. Since the card is still being pushed and guided, and since the arm 2 has the requisite flexibility, it is the end of the arm extended by the stop 8 that gets deflected. With the card, continuing its "ascent" on the sloping part 9, there comes an instant when it comes into contact with the curved ends of the conductors 14. Then, with the card being still pushed, it reaches its ultimate position to enable reading. In this position, the conductors of the card (which are not shown in the figures) are in contact with the conductors 14.

The curved shape of the conductors 14 enable these conductors, initially, to come into a position where they lightly tough with the conductors of the card. In a second stage, the elastic deformation of the conductors 14 provides for sound electrical connection with the conductors of the card. In this second stage, slight friction occurs between the conductors to be placed in contact while the total pressure has not yet been set up. This phenomenon is capable, in itself, of providing the right compromise between the mutual wear and tear of the conductors and the self-cleaning process enabling high quality electrical connection.

When the card is being removed, the mechanical effects are strictly in the reverse order of those created at insertion.

Thus, it is possible for the conductors of the device never to come into contact with the elastic parts of the card, and this eliminates all risks of deterioration in the quality of the electrical connections.

In the example of the application of the invention described above, the setting up of electrical contact between the memory card and its reader forms a temporary electrical connection. However, it is within the scope of the present invention to provide for more lasting or even permanent electrical connections.

What is claimed is:

1. A device for setting up electrical contact among conductors (14) distributed between a first element (20) and a second element (3), the setting up of the contact between the conductors having to be made when the first element (20) is in a pre-determined position with respect to the second element (14-3), the device being solidly joined to the second element, said device including:

means for guiding (1) the first element toward said determined position;

a stop (8) designed to stop the first element (20) when it has reached said determined position, said stop comprising means (9) enabling said conductors to be gradually put into contact, said device further including a flexible strip (2) formed by an arm(7), fixed by one of its ends (5,6) to said guiding means (1), the other end of which is extended by a part (8) forming said stop.

2. Memory card reader, comprising a device according to claim 1.

3. A device according to claim 1, wherein the means enabling the conductors to be gradually placed in contact are formed by a sloping part (4).

4. A device according to claim 3, wherein the conductors (14) of the second element (3) are supported by a contact-holder (3) fixed to the flexible strip (2).

5. A device according to claim 4, wherein the conductors (14) of the second element (3) are folded, in the contact establishing zone, in an elastically deformable cross shape.

6. An electronic card reader contact assembly comprising a card guide (1) for receiving and guiding an inserted electronic memory card having exposed electric contacts on a first path, an elongated flexible strip (2) cantilever mounted at one location (6) to said card guide (1), and having at its cantilevered end a stop part and a sloping portion, said sloping portion normally aligned at one end of said first path and sloping from said path towards said flexible strip, and stop part joining said sloping portion to said flexible strip, and defining the end of said path, said stop member having a face substantially perpendicular to said path, a contact holder (3) mounted on said flexible strip between said one location where the flexible strip is cantilevered mounted and said stop at the cantilevered end, and having contacts (14) extending beyond one face thereof adjacent to said path when in its normal position, whereby when a card is inserted in the guide it travels along said guide until the card engages the sloping portion, which then, as the card is inserted further, pulls the flexible strip and the card towards one another until the end of the card reaches the stop, and simultaneously, the contacts on the contact holder is drawn towards, and into contact with, contacts on the card.

7. An assembly according to claim 6 wherein said card guide (1) includes a slot (4) which has fixed parallel flat faces for receiving said card into said slot parallel thereto, whereby contact is made to said contacts on said card without any pivoting of said card at the entrance of the slot.

* * * * *